(12) United States Patent
Jung et al.

(10) Patent No.: US 7,801,510 B2
(45) Date of Patent: Sep. 21, 2010

(54) AUTHENTICATION METHOD IN A MOBILE BROADCAST SYSTEM AND SYSTEM THEREOF

(75) Inventors: Bo-Sun Jung, Seongnam-si (KR);
Sung-Oh Hwang, Yongin-si (KR);
Jong-Hyo Lee, Pyeongtaek-si (KR);
Kook-Heui Lee, Yongin-si (KR)

(73) Assignee: Samsung Electronics CO., LTD (KR)

( * ) Notice: Subject to any disclaimer, the term of this patent is extended or adjusted under 35 U.S.C. 154(b) by 756 days.

(21) Appl. No.: 11/711,461

(22) Filed: Feb. 27, 2007

(65) Prior Publication Data
US 2007/0224971 A1  Sep. 27, 2007

(30) Foreign Application Priority Data
Feb. 27, 2006 (KR) ............... 10-2006-0018864
Jun. 29, 2006 (KR) ............... 10-2006-0059994

(51) Int. Cl.
H04M 1/66 (2006.01)
H04M 1/68 (2006.01)
H04M 3/16 (2006.01)

(52) U.S. Cl. .................. 455/411; 455/410
(58) Field of Classification Search .............. 455/410, 455/411
See application file for complete search history.

(56) References Cited

U.S. PATENT DOCUMENTS

| | | | |
|---|---|---|---|
| 6,741,848 B2 * | 5/2004 | Timonen et al. ........... 455/405 |
| 7,369,848 B2 * | 5/2008 | Jiang ....................... 455/432.3 |
| 7,418,596 B1 * | 8/2008 | Carroll et al. ............ 713/169 |
| 7,477,632 B1 * | 1/2009 | Radhakrishnan et al. ..... 370/338 |
| 7,499,438 B2 * | 3/2009 | Hinman et al. ............ 370/338 |
| 7,502,607 B2 * | 3/2009 | Laitinen .................. 455/411 |
| 2002/0168960 A1 * | 11/2002 | Jacobson et al. .......... 455/410 |
| 2003/0007510 A1 * | 1/2003 | Yeo et al. ................ 370/469 |
| 2003/0065777 A1 * | 4/2003 | Mattila et al. ............ 709/225 |
| 2004/0117860 A1 * | 6/2004 | Yi et al. .................. 725/147 |
| 2004/0147266 A1 * | 7/2004 | Hwang et al. ............. 455/445 |
| 2004/0242197 A1 * | 12/2004 | Fontaine .................. 455/411 |
| 2005/0048951 A1 * | 3/2005 | Saito ..................... 455/411 |
| 2005/0090232 A1 * | 4/2005 | Hsu ...................... 455/411 |
| 2005/0164702 A1 * | 7/2005 | Carlson et al. ............ 455/432.1 |
| 2005/0170842 A1 * | 8/2005 | Chen ..................... 455/454 |
| 2005/0197100 A1 * | 9/2005 | Evenou et al. ............ 455/410 |
| 2006/0003765 A1 * | 1/2006 | Patil et al. ............... 455/432.1 |

(Continued)

FOREIGN PATENT DOCUMENTS

JP  2003-318874  11/2003
JP  2007-13685   1/2007

(Continued)

OTHER PUBLICATIONS

Wireless LAN Security, Cisco Systems, p. 1-6, 2001.

*Primary Examiner*—Lester Kincaid
*Assistant Examiner*—Nathan Mitchell
(74) *Attorney, Agent, or Firm*—The Farrell Law Firm, LLP (57) ABSTRACT

A mobile broadcast system having a terminal is disclosed. The terminal transmits a message including a type-based identifier (ID) to a BCAST Subscription Management (BSM) in a corresponding network during network access. The BSM determines a type of an ID of the received message and then performs an authentication procedure according to the type of the ID.

20 Claims, 8 Drawing Sheets

U.S. PATENT DOCUMENTS

| | | | |
|---|---|---|---|
| 2006/0030312 A1* | 2/2006 | Han et al. | 455/432.1 |
| 2006/0035645 A1* | 2/2006 | Kim | 455/452.1 |
| 2006/0104225 A1* | 5/2006 | Kim et al. | 370/313 |
| 2006/0109812 A1* | 5/2006 | Kim et al. | 370/329 |
| 2006/0154646 A1* | 7/2006 | Tung | 455/411 |

FOREIGN PATENT DOCUMENTS

| | | |
|---|---|---|
| KR | 1020040099849 | 12/2004 |
| KR | 1020050092532 | 9/2005 |
| KR | 1020060131158 | 12/2006 |

* cited by examiner

AUTHENTICATION METHOD IN A MOBILE BROADCAST SYSTEM AND SYSTEM THEREOF

PRIORITY

This application claims the benefit under 35 U.S.C. §119 (a) of a Korean Patent Application filed in the Korean Intellectual Property Office on Feb. 27, 2006 and assigned Ser. No. 2006-18864, and a Korean Patent Application filed in the Korean Intellectual Property Office on Jun. 29, 2006 and assigned Ser. No. 2006-59994, the disclosure of which is incorporated herein by reference.

BACKGROUND OF THE INVENTION

1. Field of the Invention

The present invention relates generally to an authentication method in a mobile broadcast system and in particular, to an authentication method for identifying a user ID and a terminal ID in a mobile broadcast system and a system thereof.

2. Description of the Related Art

The mobile communication market constantly faces the need for production of new services through recombination or integration of the existing technologies. Today, due to the development of communication and broadcast technologies, the conventional broadcast system or mobile communication system has reached the phase of providing broadcast services through portable terminals (or mobile terminals) such as mobile phone, Personal Digital Assistant (PDA), and the like. Convergence of mobile communication service and Internet Protocol (IP) technology is now the mainstream of the next generation mobile communication technology in harmony between the latent market needs, the increasing user demand for multimedia services, the strategy of the service providers for providing new services like the broadcast service in addition to the existing voice service, and the interests of the Information Technology (IT) companies that are reinforcing their mobile communication business to meet the user demands.

Open Mobile Alliance (OMA), which is a group assembled to study the standard for the inter-working between individual mobile solutions, mainly takes charge of establishing various application standards for mobile game, Internet service, and the like. In particular, OMA Browser and Content (BAC) Mobile Broadcast (BCAST) Sub Working Group, one of the OMA working groups, is studying the technology that provides broadcast services using mobile terminals. A brief description will now be made of a mobile broadcast system being discussed in OMA BCAST Working Group.

In the mobile broadcast system, a mobile terminal that receives a broadcast service should receive service guide information including description information of the service itself, charging information for the service, and information on a reception method of the service. The mobile terminal receives a corresponding service using the service guide information.

Although a description of the existing technology and the present invention will be made herein with reference to the OMA BCAST technology, which is one mobile broadcast technology standard, by way of example, this is not intended to limit the present invention.

Figure 1:
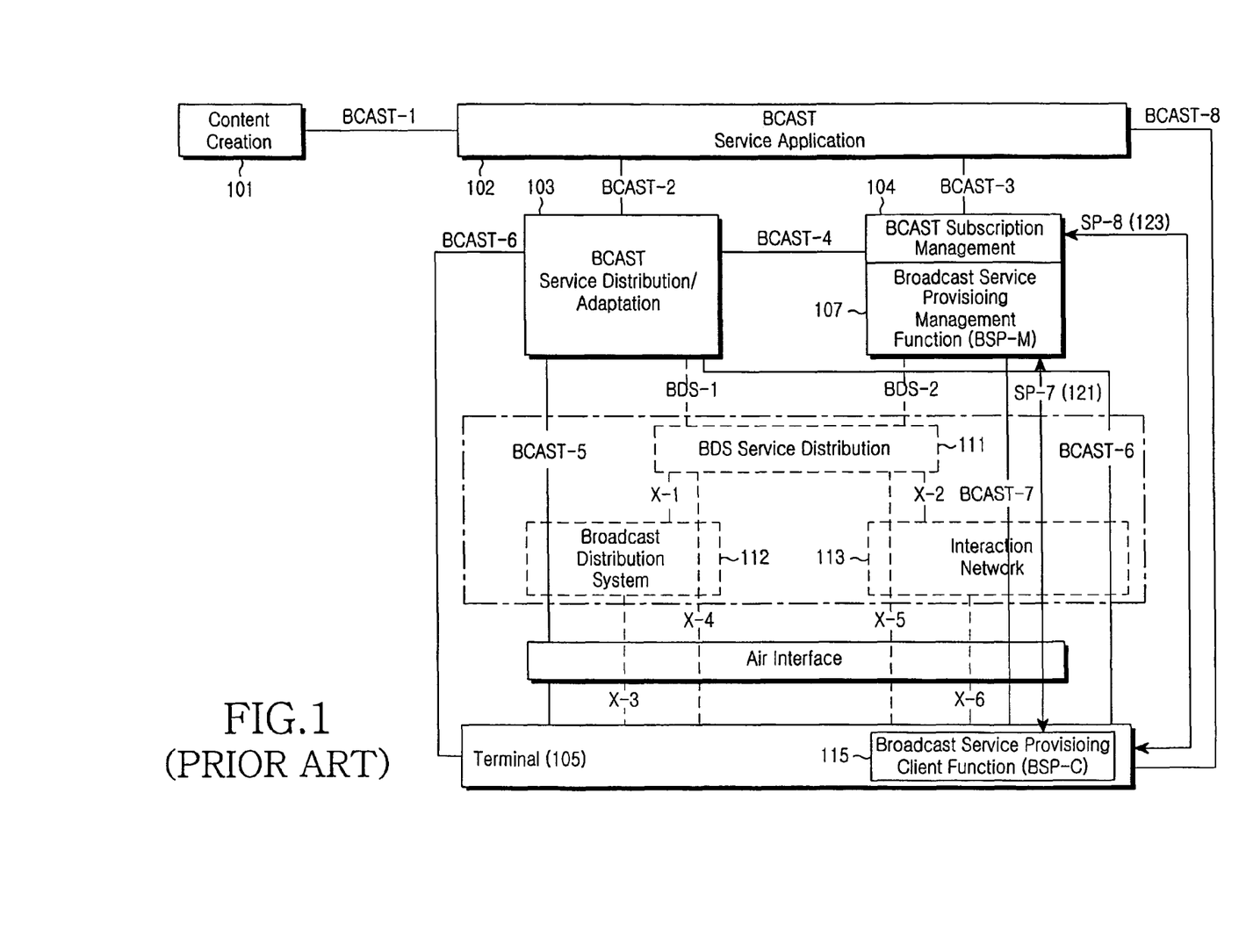
FIG. 1 is a diagram illustrating functional architecture of a conventional mobile broadcast system.

FIG. 1 is a diagram illustrating the functional architecture of a conventional mobile broadcast system.

In FIG. 1, a Content Creation (CC) 101 provides contents, which are the basis of a Broadcast Service (BCAST) service, and the contents can include files for the general broadcast service, for example, data for movie, audio, and video. In addition, the CC 101 provides a BCAST Service Application (BSA) 102 with attributes for the contents, used for generating a service guide and determining a transmission bearer over which the service will be transmitted.

The BSA 102 processes BCAST service data provided from the CC 101 into the format suitable for providing multimedia encoding, content protection, and interaction service. In addition, the BSA 102 provides the content attributes provided from the CC 101, to a BCAST Service Distribution/Adaptation (BSDA) 103 and a BCAST Subscription Management (BSM) 104.

The BSDA 103 performs file/stream transmission, service collection, service protection, service guide generation/delivery, service notification, and the like, using the BCAST service data provided from the BSA 102. In addition, the BSDA 103 adjusts the service to be suitable for a Broadcast Distribution System (BDS) 112.

The BSM 104 manages on a hardware/software basis the service specification such as a subscription and charging-related function for BCAST service users, the specification of information used for the BCAST service, and the terminal receiving the BCAST service.

A Terminal 105 receives the content and program support information such as service guide and content protection information, and provides a broadcast service thereof to a user. A BDS Service Distribution (BDS-SD) 111 transmits a BCAST service to a plurality of terminals through interactive communication between the BDS 112 and an Interaction Network (IN) 113. Herein, the Terminal 105 corresponds to a mobile terminal of the present invention.

The BDS 112 transmits a BCAST service through a broadcast channel, and can be, for example, a broadcast/communication network based on $3^{rd}$ Generation Project Partnership (3GPP) Multimedia Broadcast Multicast Service (MBMS), $3^{rd}$ Generation Project Partnership 2 (3GPP2) Broadcast Multicast Service (BCMCS), Digital Video Broadcasting—Handheld (DVB-H), or Internet Protocol (IP). The IN 113 provides interaction channels, and can be, for example, a cellular network.

In the mobile broadcast system, a service provisioning function manages user subscription to the BCAST service and purchase of the subscribed service. In addition, the service provisioning function provides additional information for payment and purchase, such as status information of user names. A Broadcast Service Provisioning Management (BSP-M) 107 in the BSM 104 provides subscription and purchase information. Based on the user subscription information, the BSP-M 107 provides charging information of users to the entities concerned, and supports charging for the BCAST service.

The BSP-M 107 receives a request and a report for subscription and charging from a Broadcast Service Provisioning Client Function (BSP-C) 115 through an SP-7 interface 121 and an SP-8 interface 123. The BSP-C 115 takes charge of making a report on subscription and purchase of the BCAST service. The BSP-C 115 can extract provisioning information from a service guide, and can make a request for subscription and purchase or a request for additional information depending on the extracted provisioning information.

Table 1 provides a definition of the SP-7 interface 121 and the SP-8 interface 123.

TABLE 1

| Interface | Reference Point | Usage |
|---|---|---|
| 111 SP-7 | BCAST-7 | Delivery of messages used for a subscription such as subscription request of user and response from BCAST Subscription Management. Delivery of payment information |
| 112 SP-8 | Out of band | The End User subscribes and purchases the services through the out-of-band interfaces. This is beyond the scope of OMA BCAST. |

In a system providing the BCAST service, in order for a user to enjoy service/content such as servicing provisioning or roaming, a mobile terminal should deliver user ID and terminal ID (or device ID) information to the BCAST service provider for subscription, purchase and authentication procedures for the corresponding service/content. That is, for the BCAST service, various service providers including the existing DVB, 3GPP and 3GPP2 service providers, provide the service. Here, there are various types of users and terminals. However, there is no currently available authentication procedure for identifying the various users and terminals.

SUMMARY OF THE INVENTION

An aspect of the present invention is to address at least the problems and/or disadvantages and to provide at least the advantages described below. Accordingly, one aspect of the present invention is to provide an authentication method capable of identifying users of several service providers and various services in a mobile broadcast system, and a system thereof.

Another aspect of the present invention is to provide an authentication method capable of identifying users and terminals of several service providers and efficiently charging them in a mobile broadcast system.

According to one aspect of the present invention, there is provided an authentication method of a terminal in a mobile broadcast system. The authentication method includes determining at least one of a user identifier (ID) and a terminal ID according to usage during network access; and transmitting, to a corresponding network, a message including ID information generated according to a type of the determined authentication ID.

According to another aspect of the present invention, there is provided an authentication method of a BCAST Subscription Management (BSM) in a mobile broadcast system. The authentication method includes receiving from a terminal a message including a type-based identifier (ID); and determining a type of an ID of the received message and then performing an authentication procedure according to the type of the ID.

According to another aspect of the present invention, there is provided an authentication method in a mobile broadcast system. The authentication method includes transmitting, by a terminal, a message including a type-based identifier (ID) to a BCAST Subscription Management (BSM) in a corresponding network during network access; and determining, by the BSM, a type of an ID of the received message, and performing an authentication procedure according to the type of the ID.

According to yet another aspect of the present invention, there is provided a mobile broadcast system including a terminal for transmitting a message including a type-based identifier (ID) to a BCAST Subscription Management (BSM) in a corresponding network during network access; and the BSM for determining a type of an ID of the received message, and then performing an authentication procedure according to the type of the ID.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

For convenience, a description of the present invention will be made herein using the names of the entities defined in the $3^{rd}$ Generation Partnership Project (3GPP), which is the asynchronous mobile communication standard, or defined in the BCAST of Open Mobile Alliance (OMA), which is a standards group for the application of a mobile terminal. However, the stated standards and entity names thereof are not intended to limit the scope of the present invention, and the present invention can be applied to any system having similar technical background.

The present invention provides a method for identifying an ID of a user or a terminal in an authentication procedure, such as service provisioning and roaming, and a system thereof.

For a better understanding of the present invention, a description will now be made of a message schema table and a roaming method used in the mobile broadcast system of the present invention.

Figure 2:
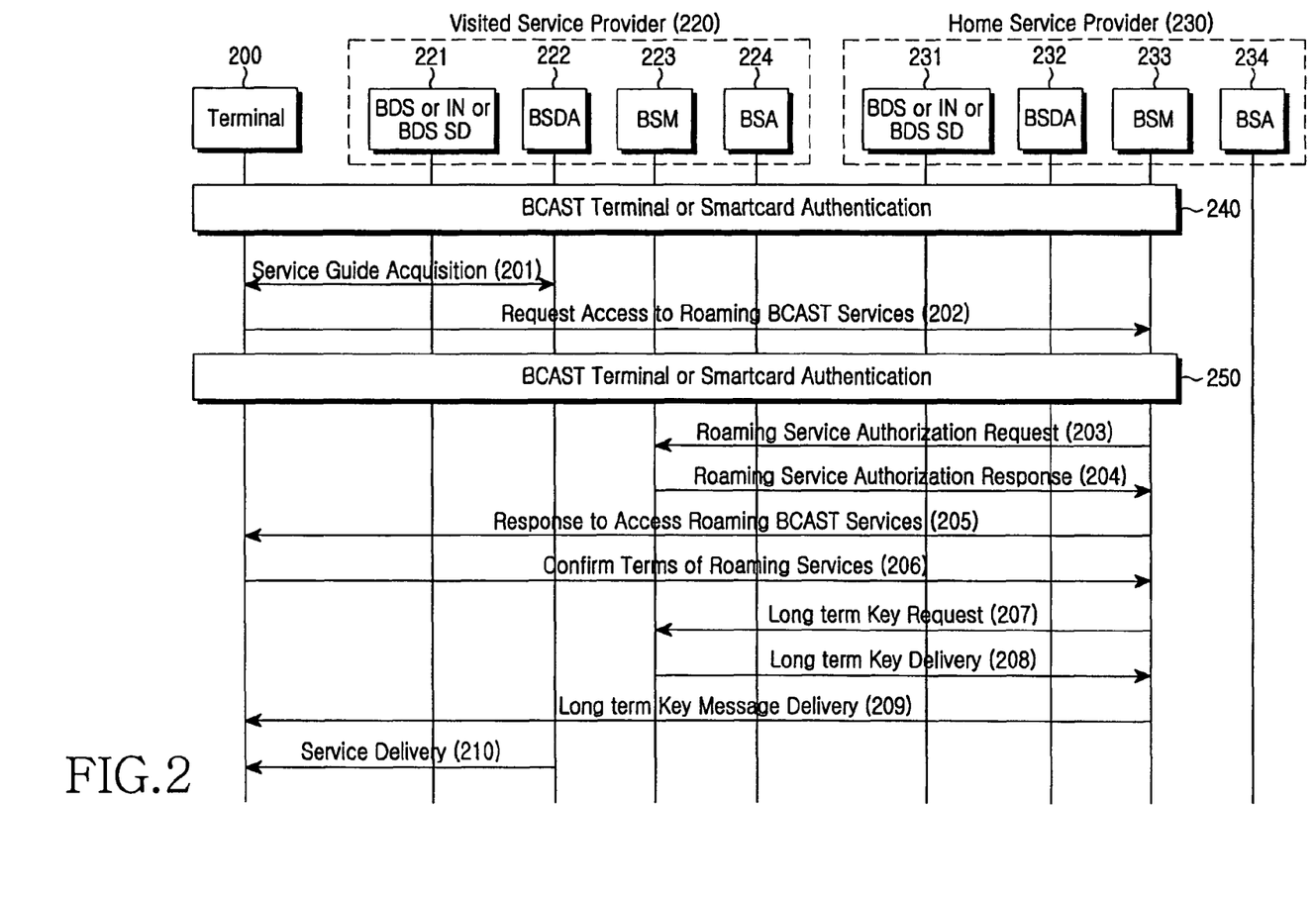
FIG. 2 is a signaling diagram illustrating a roaming procedure in a mobile broadcast system.

FIG. 2 is a signaling diagram illustrating a roaming procedure in a mobile broadcast system. A roaming procedure is shown in a Visited Network (Visited N/W) rather than a Home Network (Home N/W) to which a mobile terminal has originally subscribed.

In FIG. 2, a Terminal 200 can perform a terminal or smartcard authentication procedure for the network in step 240. Thereafter, the Terminal 200 acquires a service guide from a BSDA 222 in a Visited N/W 220 in step 201. The Terminal 200 then determines whether to request roaming. If the Terminal 200 determines to request roaming, it sends in step 202 a roaming message for broadcast service access to a BSM 233 in a Home N/W 230 to which it has subscribed. Thereafter, in step 250, the Terminal 200 can perform a terminal or smartcard authentication procedure separately for the roaming. Upon receipt of the roaming request message, the BSM 233 in the Home N/W 230 sends an authentication request message for the roaming service to a BSM 223 in the Visited N/W 220 where which the Terminal 200 is located. Next, the BSM 223 in the Visited N/W 220 sends in step 204 an authentication response message including charging information and information indicating whether the roaming is possible.

Upon receipt of the authentication response message, the BSM 233 in the Home N/W 230 sends in step 205 a response message to the roaming request to the Terminal 200 based on the authentication response from the Visited N/W 220. Upon receipt of the response message, the Terminal 200 checks in step 206 roaming approval and roaming charging information, and provides roaming request information to the BSM 233 in the Home N/W 230. It is assumed herein that the Terminal 200 requests roaming.

Upon receipt of the roaming request, the BSM 233 in the Home N/W 230 sends a request for a Long Term Key (LTK) to the BSM 223 in the Visited N/W 220 in step 207, and then receives the requested LTK in step 208. Thereafter, the BSM 233 in the Home N/W 230 delivers LTK to the Terminal 200 in step 209. Upon receipt of the LTK, the Terminal 200 receives an encoded broadcast service from the Visited N/W 220 in step 210.

Figure 3:
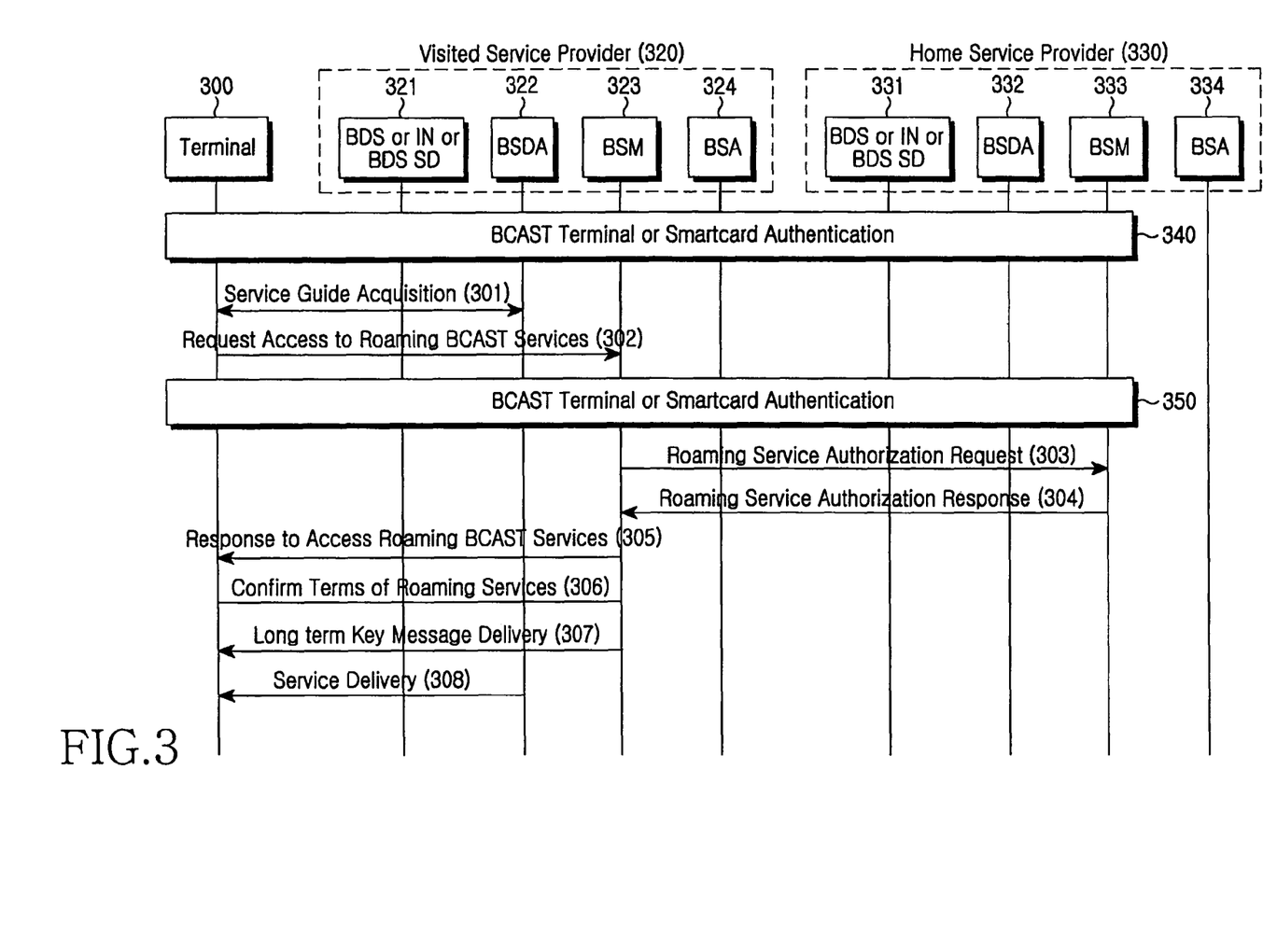
FIG. 3 is a signaling diagram illustrating a roaming procedure in a mobile broadcast system.

FIG. 3 is a signaling diagram illustrating a roaming procedure in a mobile broadcast system. This shows a procedure for performing roaming through a Visited N/W when a mobile terminal moves to an area managed by the Visited N/W. A description of the process equal to the process described in FIG. 2 will be omitted herein.

In FIG. 3, a Terminal 300, when it moves to a Visited N/W 320, receives a service guide from a BSDA 322 in the Visited N/W 320. The Terminal 300 then determines whether to request roaming. If the Terminal 300 determines to request roaming, it sends a roaming request message for access to a desired broadcast service to a BSM 323 in the Visited N/W 320. Thereafter, in step 350, the Terminal 300 can perform a terminal or smartcard authentication procedure separately for the roaming. Upon receipt of the roaming request message, the BSM 323 in the Visited N/W 320 can reject the request if the roaming is impossible.

It is assumed herein that the roaming is possible. Therefore, the BSM 323 in the Visited N/W 320 sends in step 303 an authentication request message for an authentication procedure for the roaming service to a BSM 333 in a Home N/W 330 to which the Terminal 300 has subscribed. Upon receipt of the authentication request message, the BSM 333 in the Home N/W 330 determines whether to approve the roaming, and then sends in step 304 a response message to the authentication request message to the BSM 323 in the Visited N/W 320.

Upon receipt of the response message, the BSM 323 in the Visited N/W 320 sends in step 305 a response message indicating approval/disapproval of the roaming in response to the roaming request message. Herein, the response message can include charging information. The Terminal 300 checks the response message, and then sends a request for the roaming in step 306. In response, the Terminal 300 receives an LTK from the BSM 323 in the Visited N/W 320 in step 307. Upon receipt of the LTK, the Terminal 300 receives in step 308 an encoded broadcast service from the Visited N/W 320.

A description will now be made of a schema table of the messages used for roaming. The message schema table is shown below in Table 2. In Table 2, 'Name' indicates names of elements and attributes constituting the corresponding message. 'Type' indicates a type (Element or Attribute) of the corresponding name. The elements have values E1, E2, E3 and E4, wherein E1 indicates an upper element for the entire message, E2 indicates a sub-element of E1, E3 indicates a sub-element of E2, and E4 indicates a sub-element of E3. An attribute is denoted by A, and A indicates an attribute of the corresponding element. For example, A under E1 indicates an attribute of E1. 'Category' is used for determining whether the corresponding element or attribute is mandatory or optional, and has an M value for the mandatory element or attribute, and an O value for the optional element or attribute. 'Cardinality' indicates a relationship between elements, and has values 0, 0 . . . 1, 1, 0 . . . n, 1 . . . n. Herein, 0 means an optional relationship, 1 means mandatory relationship, and n means that a plurality of values can be used. For example, 0 . . . n means that the corresponding message may have no element, or n elements. 'Description' indicates meaning of the corresponding element or attribute, and 'Data Type' indicates a data type for the corresponding element or attribute.

TABLE 2

| Name | Type | Category | Cardinality | Description | Data Type |
| --- | --- | --- | --- | --- | --- |

As done in the service provisioning or roaming procedure, user ID information is delivered together with a request message, for subscription, purchase or authentication procedure for the corresponding service/content, in order for a user to view the service/content. The subscription, purchase or authentication procedure should delivers a user ID to authenticate the user when the user performs a subscription, purchase or authentication procedure on the corresponding service in order to receive a BCAST service, such as subscription to notification message reception, in addition to service subscription, update request for a service key, service close, or roaming service request, with use of the service provisioning function.

The user ID can have various types such as text-type user name, International Mobile Subscriber Identity (IMSI), and user ID defined by the service provider, and there is a need to provide a method for identifying a corresponding user ID by defining types of users as shown in Table 3. In Table 3, Type=0 to Type=3 are defined to identify user name, IMSI, E-mail address, and PIN number, respectively. In the present invention, therefore, for all subscription, purchase, authentication and update request messages having a user ID, Type should include an attribute for a user ID (UserID) as shown in Table 3. For example, UserID=Samsung for Type=0, UserID=82312790000 for Type=1, UserID=Samsung@samsung.com for Type=2, and UserID=12345678 for Type=3. In addition, the user ID can be defined as a UserID value desired by the user, or can be assigned by the service provider.

TABLE 3

| Name | Type | Category | Cardinality | Description | Data Type |
|------|------|----------|-------------|-------------|-----------|
| UserID | E | O | 0...N | The user identity known to the BSM.<br>Contains the following attributes:<br>Type | String |
| Type | A | M | 1 | Specifies the type of User ID. Allowed values are<br>0 - UserName defined in [RFC2865]<br>1 - IMSI<br>2 - E-mail Address<br>3 - PIN Number<br>4-200 reserved for future use<br>201-255 reserved for proprietary use | unsigned Byte |

A terminal ID (or device ID), together with the user ID, should be included in the service provisioning and roaming messages as shown in Table 4. The terminal ID can differ according to DVB, 3GPP MBMS, or 3GPP2 BCMCS broadcast network from which the corresponding terminal receives the service. Therefore, there is a need to provide information indicating a type of the corresponding ID in order to identify the corresponding terminal ID (DeviceID or TerminalID), and as shown in Table 4, Type=0 to Type=2 can be defined to identify DVB DeviceID, 3GPP DeviceID (International Mobile Equipment Identity (IMEI)), and 3GPP2 DeviceID (Mobile Station Equipment Identifier (MEID)), respectively, as DeviceID included in the message.

In addition, when supporting multiple modes, the corresponding terminal can receive information on a broadcast network desiring the corresponding service through terminal authentication. For example, if a terminal supporting DVB and 3GPP MBMS desires to receive a DVB service during service subscription through a service guide of the BCAST service provider, it makes a subscription request using the Type=0 DVB DeviceID, and can receive the corresponding DVB service after terminal authentication through the subscription request. In addition, when the terminal desires to receive both DVB and 3GPP MBMS services, it can transmit a subscription request message with Type=0 Device ID and Type=1 DeviceID, and receive the services through the two broadcast networks after completion of authentications.

The user ID and terminal ID proposed in the present invention can be applied to every message related to the authentication procedure in the mobile broadcast system, and at least one of them should necessarily be included in the message.

Figure 4:
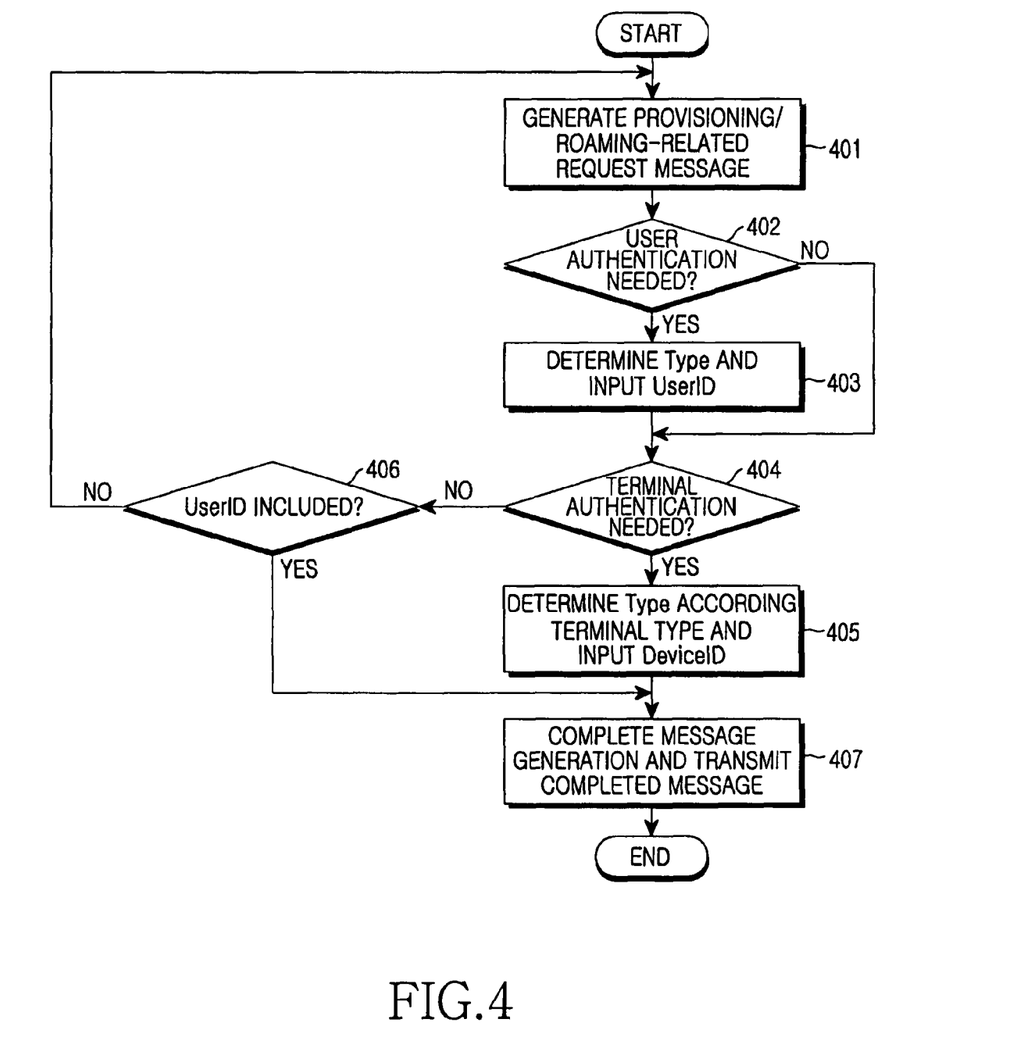
FIG. 4 is a flow diagram illustrating a method for generating an authentication-related message in a terminal of a mobile broadcast system according to an embodiment of the present invention.

FIG. 4 is a flow diagram illustrating a method for generating an authentication-related message in a terminal of a mobile broadcast system according to an embodiment of the present invention. Essentially, a method for generating a user ID or a terminal ID is shown.

It should be noted herein that when a terminal generates a message, at least one of a user ID and a terminal ID should necessarily be included in the corresponding message and both IDs can also be included in the message. In addition, inclusion of the IDs can be subject to change according to usage. For example, if the user desires to limit the service use to a particular user and a particular terminal, he/she can input specific values as a user ID and a terminal ID. In this case, the subscribed service can be viewed only by the correspondingly user only with the corresponding terminal. In addition, if the IDs are set such that anyone carrying a corresponding terminal can view the service, the authentication procedure is performed using only the terminal ID without the user ID. Conversely, if a particular user desires to receive the service with any terminal in which he/she is registered, the authentication procedure is performed using only the user ID.

In FIG. 4, a terminal generates a provisioning/roaming-related request message in step 401, and determines in step 402 whether there is a need for user authentication. If there is a need for user authentication, the terminal determines in step 403 a Type for a desired user ID, and stores a user ID value as an element of the user ID according to the syntax specified in

TABLE 4

| Name | Type | Category | Cardinality | Description | Data Type |
|------|------|----------|-------------|-------------|-----------|
| Device ID | E | O | 0...N | A unique device identification known to the BSM:<br>Type | unsigned Int |
| Type | A | M | 1 | Specifies the type of User ID. Allowed values are<br>0 - DVB Device ID<br>1 - 3GPP Device ID (IMEI)<br>2 - 3GPP2 Device ID (MEID)<br>3 - 127 reserved for future use<br>128-255 reserved for proprietary use | unsigned Byte | the Type. Herein, a plurality of user IDs can also be included. If it is determined in step 402 that there is no need for user authentication, then the terminal jumps to step 404.

In step 404, the terminal determines whether there is a need for terminal authentication. If there is a need for terminal authentication, the terminal determines in step 405 a Type of a desired terminal ID, and designates a terminal ID value in DeviceID. Herein, a plurality of terminal IDs can also be included. However, if it is determined in step 404 that no terminal authentication information is included in the message, the terminal determines in step 406 whether UserID is included in the message. If the UserID is included, the terminal proceeds to step 407. Otherwise, if no user authentication information is included in the message, the terminal returns to step 401 and repeats the message generation. In step 407, the terminal completes inputting of the information necessary for authentication, and transmits the completed provisioning/roaming message to a corresponding BSM after completion of the message generation.

A description will now be made of a method for performing authentication procedures in a Home N/W and a Visited N/W of a mobile broadcast system according to an embodiment of the present invention.

Figure 5A:
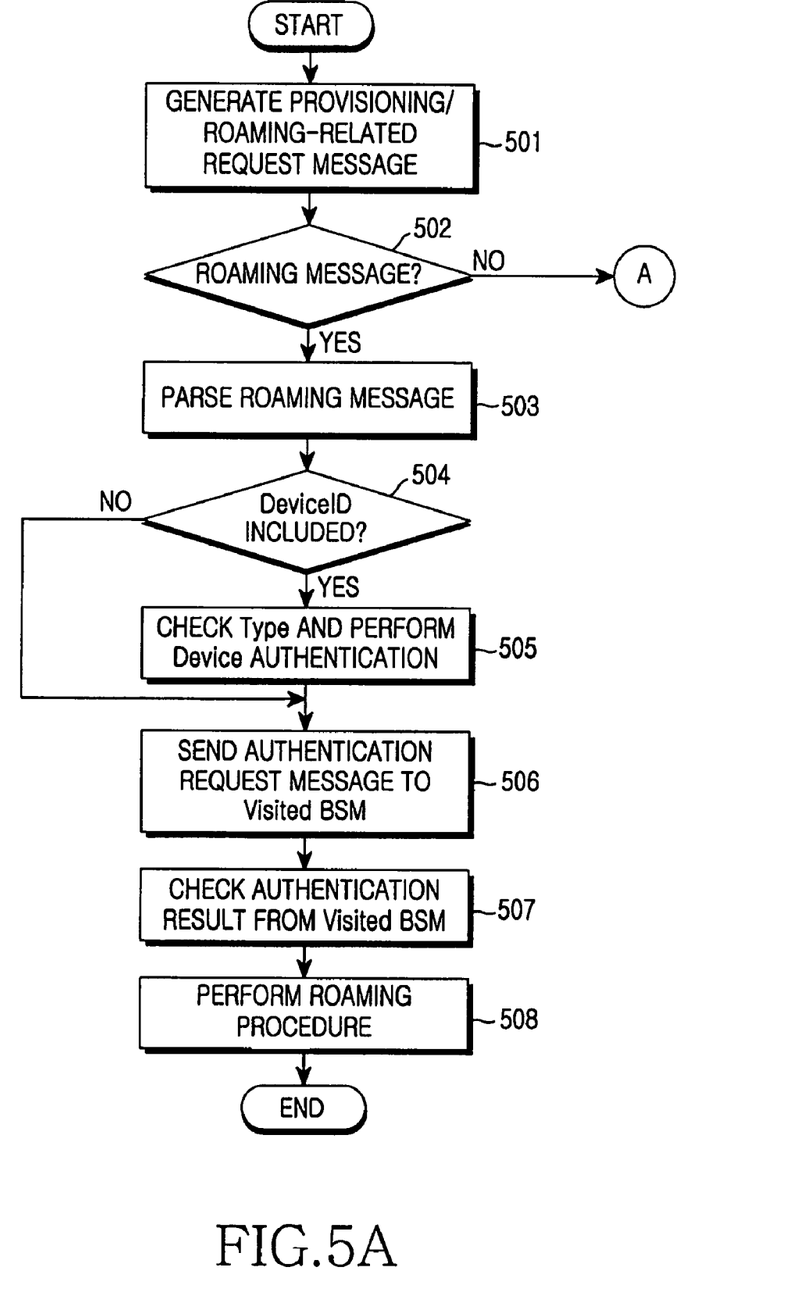
FIGS. 5A and 5B are flow diagram illustrating a BSM message handling procedure for managing subscription and service provisioning information in a Home N/W of a mobile broadcast system according to an embodiment of the present invention.
Figure 5B:
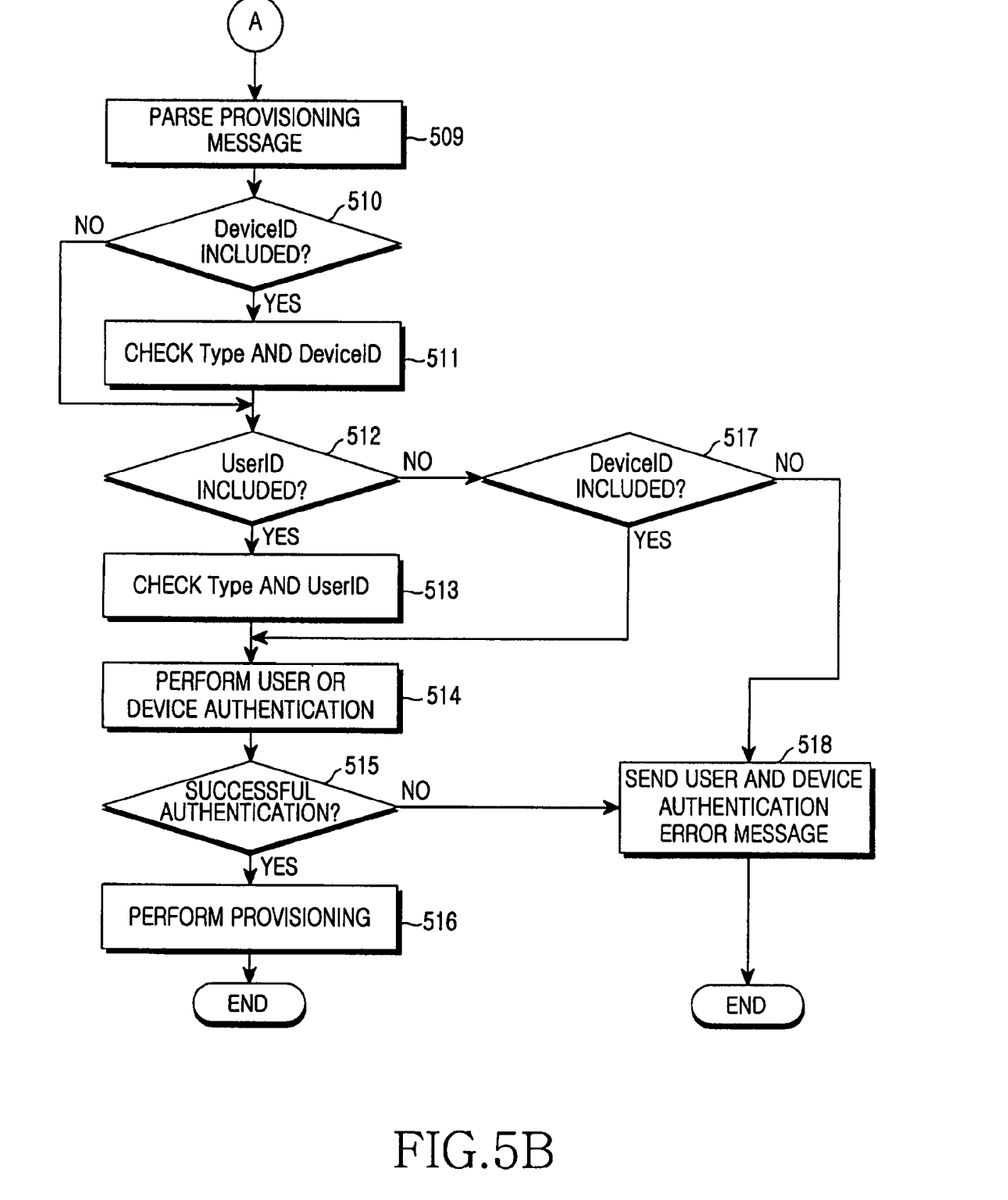

FIGS. 5A and 5B are flow diagrams illustrating a BSM message handling procedure for managing subscription and service provisioning information in a Home N/W of a mobile broadcast system according to an embodiment of the present invention.

In FIG. 5A, a BSM in a Home N/W receives a provisioning/roaming message from a terminal in step 501. After receiving the message, the BSM determines in step 502 whether the received message is a roaming message. If the received message is not a roaming message, the BSM proceeds to step 509 for a service provisioning procedure. However, if the received message is a roaming message, the BSM starts parsing the roaming message in step 503. Thereafter, the BSM determines in step 504 whether a device ID (or terminal ID) is included in the message. If the device ID is not included, the BSM jumps to step 506. However, if the device ID is included, the BSM checks in step 505 a Type of the corresponding device ID, and performs device authentication (or terminal authentication) after parsing the device ID value according to the Type. After the device authentication, the BSM transmits in step 506 an authentication request message for a roaming message to a BSM in an associated Visited N/W. In step 507, the BSM checks the authentication result and roaming scope from the BSM in the Visited N/W, and then performs a roaming procedure in step 508.

Referring to FIG. 5B, the BSM starts parsing a service provisioning message in step 509, and determines in step 510 whether a device ID is included in the corresponding message. If the device ID is included, the BSM parses the corresponding device ID according to Type in step 511. In step 512, the BSM determines whether a user ID is included in the message. If the user ID is included, the BSM parses the user ID according to Type in step 513. In step 514, the BSM performs an authentication procedure using the parsed device ID and/or user ID. In step 515, the BSM determines whether the authentication procedure is successful. If the authentication procedure is successful, the BSM completes the remaining process of the service provisioning procedure in step 516.

If it is determined in step 512 that no user ID is included, the BSM determines in step 517 whether a device ID is included. This is to prevent an error which may occur when a device ID exists but when no user ID exists.

In operation, if both of the user ID and the device ID are not included in the corresponding message, or both of the user authentication and the terminal authentication are failed, the BSM transmits a corresponding authentication error message to the terminal in step 518. The final determination process of step 517 can be omitted, if the BSM performs an authentication procedure separately for the user ID and the device ID.

Figure 6:
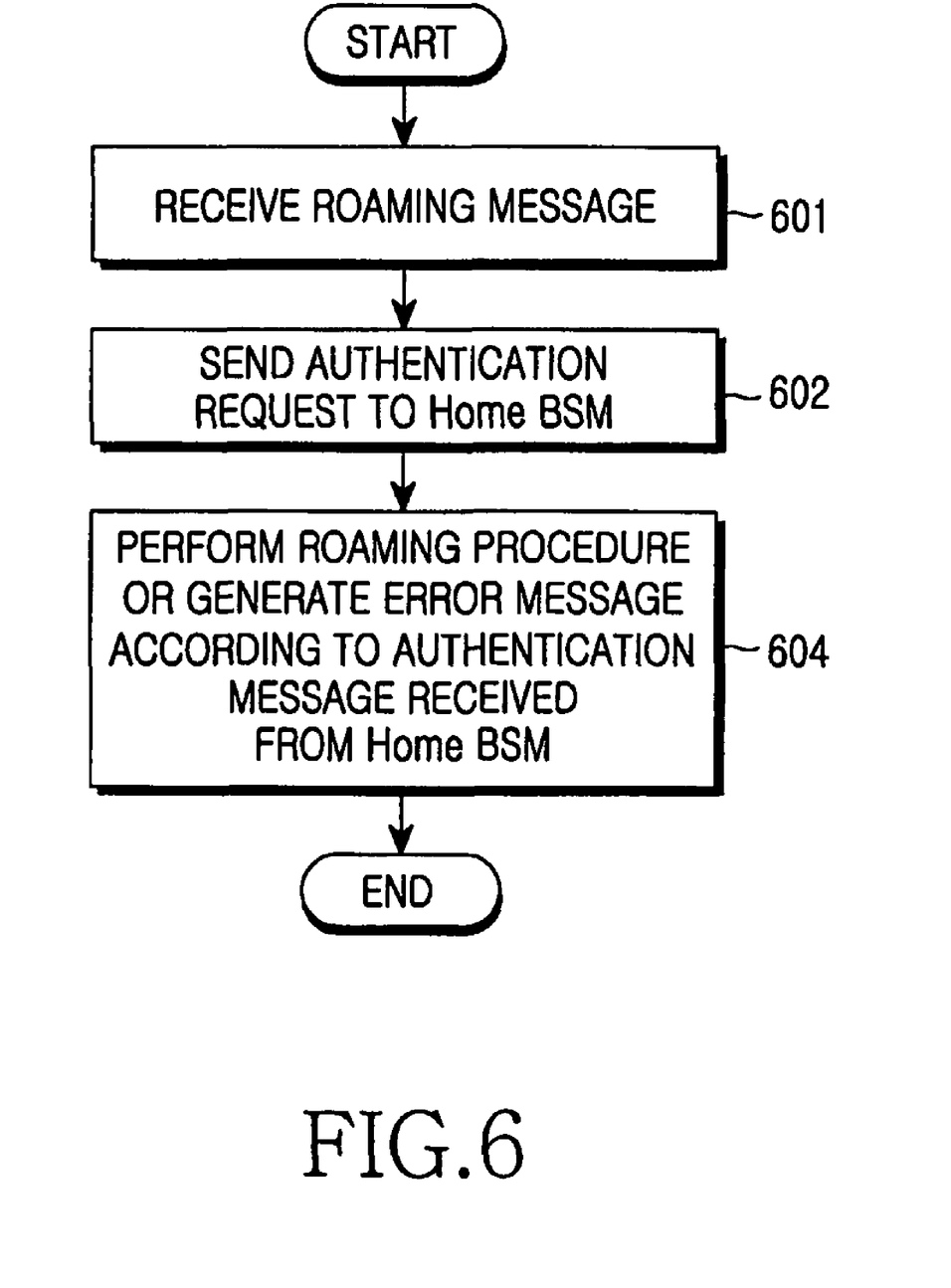
FIG. 6 is a flow diagram illustrating an authentication procedure when a terminal makes a roaming request in a Visited N/W of a mobile broadcast system according to an embodiment of the present invention.

FIG. 6 is a flow diagram illustrating an authentication procedure when a terminal makes a roaming request in a Visited N/W of a mobile broadcast system according to an embodiment of the present invention.

In FIG. 6, a BSM in a Visited N/W receives a roaming message and then performs an associated procedure in step 601. Thereafter, in step 602, the BSM in the Visited N/W sends a request for user/terminal authentication and allowable-service scope information to a BSM in a Home N/W. Next, in step 604, the BSM in the Visited N/W performs the remaining roaming procedure or generates an error message according to an authentication message received from the BSM in the Home N/W.

Figure 7:
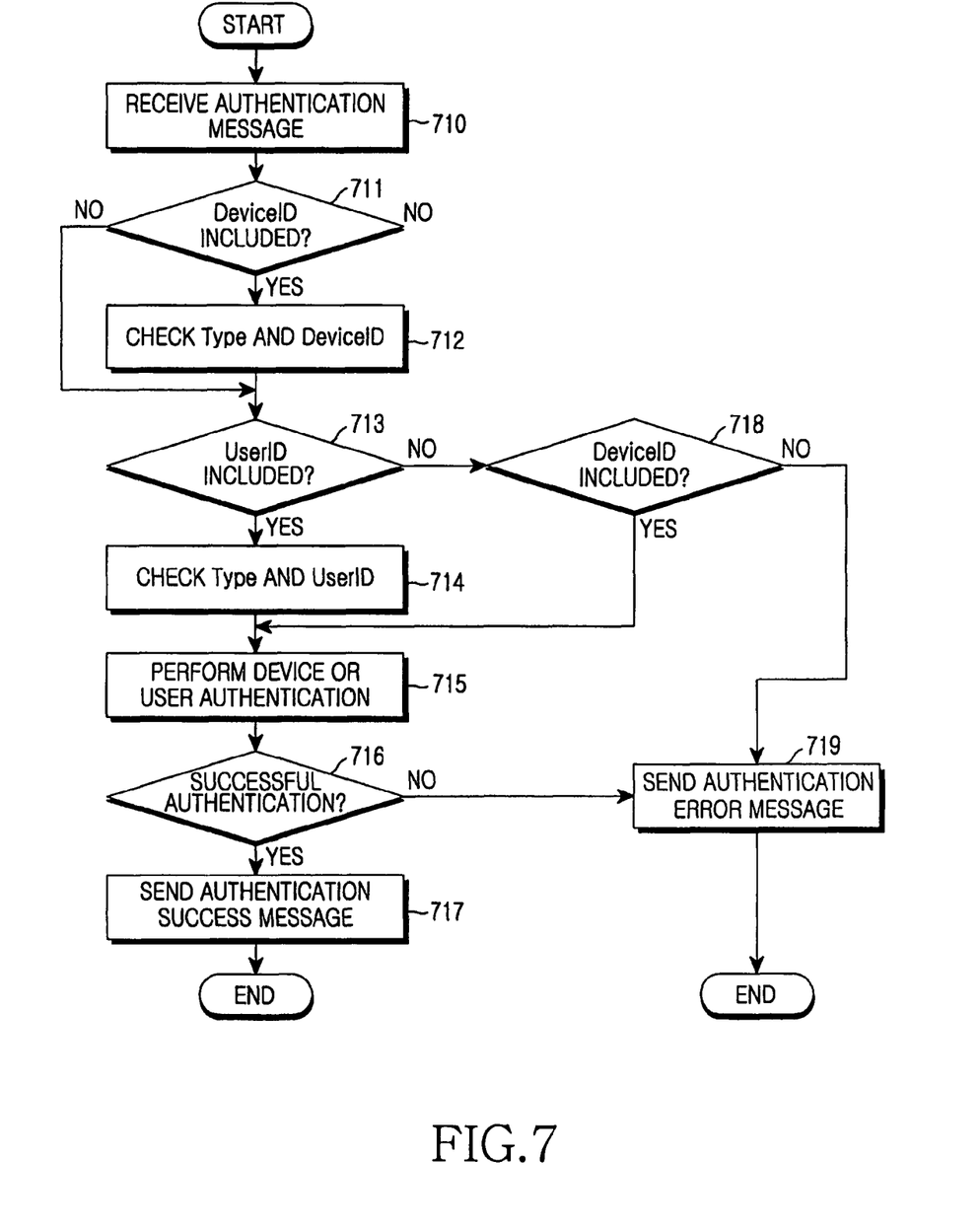
FIG. 7 is a flow diagram illustrating an authentication procedure performed in a Home N/W in response to an authentication request from a Visited N/W in a mobile broadcast system according to an embodiment of the present invention.

FIG. 7 is a flow diagram illustrating an authentication procedure performed in a Home N/W in response to an authentication request from a Visited N/W in a mobile broadcast system according to an embodiment of the present invention.

In FIG. 7, a Home N/W receives an authentication message or an associated roaming message in step 710, and determines in step 711 whether a device ID is included in the corresponding message. If the device ID is included, the Home N/W checks a Type and then parses a device ID value according to the Type in step 712. Thereafter, in step 713, the Home N/W determines whether a user ID is included. If the user ID is included, the Home N/W parses the user ID according to Type in step 714. In step 715, the Home N/W performs a terminal or user authentication using the device ID or user ID. Thereafter, in step 716, the Home N/W determines whether the corresponding authentication is successful. If the corresponding authentication is successful, the Home N/W transmits in step 717 an authentication success message and the necessary roaming information like the associated service scope information, to the Visited N/W.

However, if it is determined in step 713 that no user ID is included, the Home N/W then determines in step 718 whether a device ID is included. This is to prevent an error which may occur when a device ID exists but when no user ID exists.

If both the service ID and the device ID are not included in the received roaming message, or if both the user authentication and the terminal authentication are failed, the Home N/W transmits an authentication error message to the Visited N/W in step 719. The embodiment of the present invention can omit the final determination process of step 718, if the Home N/W performs an authentication procedure separately for the user ID and the device ID. Although the present invention has been described with reference to the roaming and provisioning messages by way of example, it can also be applied to every procedure related to the user authentication and the terminal authentication.

As can be understood from the foregoing description, the mobile broadcast system according to the present invention can advantageously provide various services specialized for users or terminals by providing authentications according to type of user IDs and terminal IDs of several service providers. As a result, the service providers can efficiently charge the users for the services.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An authentication method of a terminal in a mobile broadcast system, the method comprising:
    generating a service request message for a specific service;
    determining at least one of a user identifier (ID) and a terminal ID as being required for authentication for the specific service;
    determining a type of the determined at least one of the user ID and the terminal ID;
    generating ID information corresponding to the determined type of the determined at least one of the user ID and the terminal ID;
    adding the generated ID information to the service request message; and
    transmitting, to a corresponding network, the service request message including the generated ID information.

2. The authentication method of claim 1, wherein when the terminal determines the user ID to be required for authentication for the specific service, the type for the user ID includes at least one of a user name, an International Mobile Subscriber Identity (IMSI), an E-mail address, and a PIN number.

3. The authentication method of claim 1, wherein when the terminal determines the terminal ID to be required for authentication for the specific service, the type of the terminal ID indicates at least one of Digital Video Broadcasting (DVB), $3^{rd}$ Generation Partnership Project (3GPP) Multimedia Broadcast Multicast Service (MBMS), and $3^{rd}$ Generation Project Partnership 2 (3GPP2) Broadcast Multicast Service (BCMCS) terminals.

4. The authentication method of claim 1, wherein the service request message includes at least one of a provisioning message and a roaming message.

5. An authentication method of a BCAST Subscription Management (BSM) in a mobile broadcast system, the method comprising:
    receiving, from a terminal, a message including a type-based identifier (ID);
    determining a type of the type-based ID of the received message; and
    performing an authentication procedure according to the determined type of the type-based ID.

6. The authentication method of claim 5, further comprising:
    parsing a type for a user ID, if the determined type of the type-based ID is the user ID; wherein performing the authentication procedure comprises:
    performing a user authentication procedure according to the parsed type.

7. The authentication method of claim 6, wherein the type for the user ID includes at least one of a user name, an International Mobile Subscriber Identity (IMSI), an E-mail address, and a PIN number.

8. The authentication method of claim 5, further comprising:
    parsing a type for a terminal ID according to a service provisioning network, if the determined type of the type-based ID is the terminal ID;
    wherein performing the authentication procedure comprises:
    performing a terminal authentication procedure according to the parsed type.

9. The authentication method of claim 8, wherein the type of the terminal ID indicates at least one of Digital Video Broadcasting (DVB), $3^{rd}$ Generation Partnership Project (3GPP) Multimedia Broadcast Multicast Service (MBMS), and $3^{rd}$ Generation Project Partnership 2 (3GPP2) Broadcast Multicast Service (BCMCS) terminals.

10. The authentication method of claim 5, wherein the message includes at least one of a provisioning message and a roaming message.

11. A terminal of a mobile broadcast system, comprising:
    a transmitter for generating a service request message for a specific service, determining at least one of a user identifier (ID) and a terminal ID as being required for authentication for the specific service, determining a type of the determined at least one of the user ID and the terminal ID, generating ID information corresponding to the determined type of the determined at least one of the user ID and the terminal ID, adding the generated ID information to the service request message, and transmitting, to a corresponding network, the service request message including the generated ID information.

12. The terminal of claim 11, wherein when the terminal determines the user ID to be required for authentication for the specific service, the type for the user ID includes at least one of a user name, an International Mobile Subscriber Identity (IMSI), an E-mail address, and a PIN number.

13. The terminal of claim 11, wherein when the terminal determines the terminal ID to be required for authentication for the specific service, the type of the terminal ID indicates at least one of Digital Video Broadcasting (DVB), $3^{rd}$ Generation Partnership Project (3GPP) Multimedia Broadcast Multicast Service (MBMS), and $3^{rd}$ Generation Project Partnership 2 (3GPP2) Broadcast Multicast Service (BCMCS) terminals.

14. A BCAST Subscription Management (BSM) in a mobile broadcast system, comprising:
    a receiver for receiving, from a terminal, a message including a type-based identifier (ID), determining a type of the type-based ID of the received message, and performing an authentication procedure according to the determined type of the type-based ID.

15. The BSM of claim 14, wherein the receiver parses a type for a user ID if the determined type of the type-based ID is the user ID and performs a user authentication procedure according to the parsed type.

16. The BSM of claim 15, wherein the type for the user ID includes at least one of a user name, an International Mobile Subscriber Identity (IMSI), an E-mail address, and a PIN number.

17. The BSM of claim 14, wherein the receiver parses a type for a terminal ID according to a service provisioning network if the determined type of the type-based ID is the terminal ID and performs a terminal authentication procedure according to the parsed type.

18. The BSM of claim 17, wherein the type of the terminal ID indicates at least one of Digital Video Broadcasting (DVB), $3^{rd}$ Generation Partnership Project (3GPP) Multimedia Broadcast Multicast Service (MBMS), and $3^{rd}$ Generation Project Partnership 2 (3GPP2) Broadcast Multicast Service (BCMCS) terminals.

19. An authentication method in a mobile broadcast system, the method comprising:
    transmitting, by a terminal, a message including a type-based identifier (ID) to a BCAST
    Subscription Management (BSM) in a corresponding network during network access; and determining, by the BSM, a type of the type-based ID of the received message, and performing an authentication procedure according to the determined type of the type-based ID.

20. A mobile broadcast system, comprising:

a terminal for transmitting a message including a type-based identifier (ID) to a corresponding network during network access; and a BCAST Subscription Management (BSM) for receiving the message, determining a type of the type-based ID of the received message, and performing an authentication procedure according to the determined type of the type-based ID.

* * * * *